United States Patent
Bebb et al.

Patent Number: 5,573,167
Date of Patent: Nov. 12, 1996

[54] HOLDER AND METHOD OF USE

[76] Inventors: David Bebb, 11 Floramar, Rancho Santa Margarita, Calif. 92688; Jack B. Lovley, II, 21886 Michigan La., Lake Forest, Calif. 92630

[21] Appl. No.: 601,382

[22] Filed: Feb. 14, 1996

Related U.S. Application Data

[62] Division of Ser. No. 273,735, Jul. 12, 1994, abandoned.

[51] Int. Cl.⁶ .................... A45F 5/00; A01K 97/10
[52] U.S. Cl. .................... 224/666; 224/200; 224/247; 224/922; 224/269; 24/336; 43/21.2
[58] Field of Search .................... 224/200, 247, 224/248, 269, 660, 665, 666, 922; 24/3.12, 335, 336; 43/21.2, 4, 23, 25; 211/70.8

[56] References Cited

U.S. PATENT DOCUMENTS

| | | | |
|---|---|---|---|
| 360,166 | 3/1887 | Lucasse | 24/336 |
| 1,392,409 | 10/1921 | Fullenwider | 24/3.12 |
| 2,146,350 | 2/1939 | Roberts | 43/25 |
| 2,158,104 | 5/1939 | Bowen | 43/25 |
| 2,328,915 | 9/1943 | Mayer . | |
| 2,589,126 | 3/1952 | Payne . | |
| 2,666,245 | 1/1954 | Fernberg | 24/336 |
| 2,846,129 | 8/1958 | O'Brien . | |
| 2,881,926 | 4/1959 | Spence | 24/336 |
| 3,168,971 | 2/1965 | Goertzen . | |
| 3,279,009 | 10/1966 | Deane | 24/3.12 |
| 3,282,482 | 11/1966 | Scharsu | 224/922 |
| 3,488,812 | 1/1970 | Gaydos | 24/3.12 |
| 3,648,908 | 3/1972 | Thompson | 224/922 |
| 3,721,817 | 5/1973 | Fowlkes et al. | 211/70.8 |
| 3,802,032 | 4/1974 | Weed | 24/336 |
| 4,569,466 | 2/1986 | Webber | 224/253 |
| 4,739,914 | 4/1988 | Pothetes | 224/922 |
| 4,830,248 | 5/1989 | Pommenville | 224/269 |
| 4,961,505 | 10/1990 | Moeller | 211/70.8 |
| 5,044,109 | 9/1991 | Fast | 43/21.2 |
| 5,123,578 | 6/1992 | Morse | 224/151 |
| 5,212,900 | 5/1993 | Perry | 224/922 |
| 5,248,072 | 9/1993 | Jones | 224/247 |
| 5,313,735 | 5/1994 | Latouche | 43/25 |

FOREIGN PATENT DOCUMENTS

| | | | |
|---|---|---|---|
| 1025103 | 4/1953 | France | 24/336 |
| 290971 | 5/1915 | Germany | 224/252 |
| 219399 | 7/1924 | United Kingdom | 24/336 |
| 2243282 | 10/1991 | United Kingdom | 43/21.2 |

OTHER PUBLICATIONS

Instruction sheet for PUT'R THERE putter caddy by Stx, Inc. Date unknown.

*Primary Examiner*—Renee S. Luebke
*Assistant Examiner*—Gregory M. Vidovich
*Attorney, Agent, or Firm*—Casey Heeg

[57] ABSTRACT

A method is disclosed for using a holder having first and second clips arranged with their mouths facing substantially the same direction. The first clip is provided with an inner surface which is shaped to hold a cylindrical article and a mouth which is normally open so as to allow the legs of this first clip to be urged apart from each other when such a cylindrical article is pressed against it. The holder is mounted at a designated location on the user's body by attaching the second clip to a piece of material worn by the user, with the mouth of the first clip facing generally downwardly. A substantially cylindrical article is inserted into the first clip by placing the article against the mouth of this clip and lifting the article upwardly into contact with its inner surface, with the axis of the first clip's inner surface in a generally horizontal orientation. Preferably, the insertion of the article is performed by balancing it in one of the user's hands, placing the thumb of that hand on an upwardly facing surface of the holder and lifting the article into the first clip by pulling the article and thumb toward each other.

12 Claims, 2 Drawing Sheets

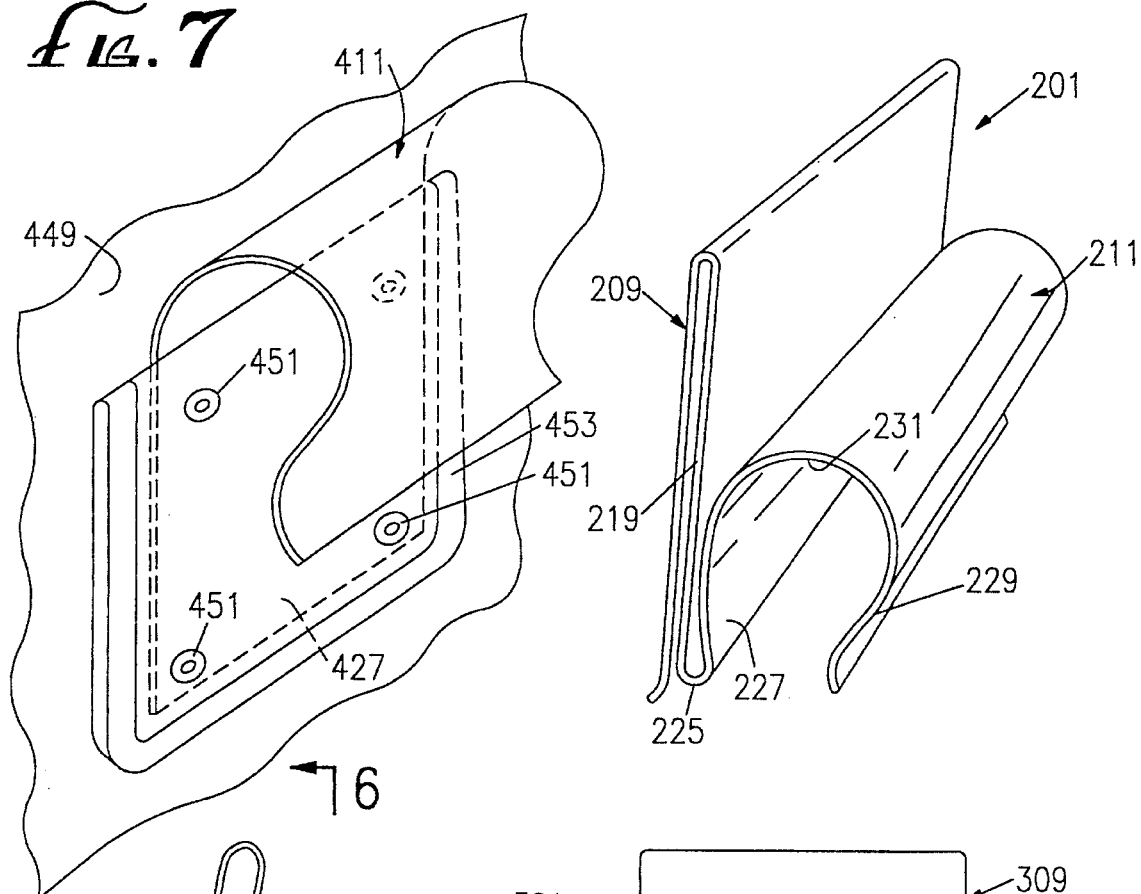

HOLDER AND METHOD OF USE

This application is a divisional of application Ser. No. 08/273,735 filed on Jul. 12, 1994, now abandoned.

This invention relates generally to the field of devices for holding articles in a position or location where they can be easily accessed, and more specifically to such devices which attach to a belt or other item of clothing worn by the user.

BACKGROUND

A wide assortment of tool and accessory holders have been proposed for holding various articles in a desired position or location. For example, in the field of fishing rod holders, many designs may be found in the prior art for resting a fishing rod in a device worn by the user, to free his hands for purposes such as baiting a hook. U.S. Pat. No. 4,569,466 (Webber) discloses a leather fishing rod holder which attaches to the user's belt and provides a closed metal ring at the rear, into which the handle of the rod may be inserted behind the reel, and an upwardly open hook at the front for supporting a part of the rod forward of the reel. Such devices, however, are relatively awkward to use and are limited in their application. Other fishing rod holders, as seen in U.S. Pat. No. 2,846,129 (O'Brien) and U.S. Pat. No. 4,739,914 (Pothetes) may be somewhat less awkward to use, but are difficult to attach and are unduly complicated and difficult to manufacture.

Numerous other devices have been proposed for holding various articles in a generally upwardly facing clip attached to a belt or other vertical supporting surface, as seen in U.S. Pat. No. 3,169,971 (Goertzen; belt-mounted holder for an archer's bow), U.S. Pat. No. 5,248,072 (Jones; belt-mounted hammer holster), U.S. Pat. No. 4,830,248 (Pommenville; golfbag-mounted accessory holder for scorecards and other golf accessories) and U.S. Pat. No. 2,589,126 (Payne; belt-mounted golf club holder). However, Goertzen and Jones require the user to remove his belt in order to attach these holders, and Pommenville and Payne are designed so the device may be accidentally dislodged from its attachment point when the article being held is lifted out of its clip. Moreover, none of these designs lend themselves to smooth, fluid motions for inserting and removing the articles to be held.

It is therefore an object of the present invention to provide an improved belt-mounted holder and method of use which addresses these and other deficiencies in prior art designs.

SUMMARY OF THE INVENTION

In accordance with an illustrative embodiment of the present invention, a holding device is disclosed which is adapted for mounting to a belt or other item of clothing worn by the user. In one form of the invention, a holder is provided having first and second clips, each having a pair of legs connected at one end with a mouth at the other end. These clips are disposed together in back-to-back fashion, with their mouths facing substantially the same direction. The first clip has an inner surface which is shaped to hold a cylindrical article, such as a fishing rod handle, and the mouth of this clip is normally open so as to allow the legs of the clip to be urged apart from each other when such a cylindrical article is pressed against it. The legs of the second clip are substantially parallel and spaced apart at their connected end by a distance less than one half the inner diameter of the first clip.

Another form of the present invention also provides a holder having first and second clips disposed together in back-to-back fashion. The first clip has an inner surface which is shaped to hold a cylindrical article, the mouth of this clip being normally open so as to allow the legs of the first clip to be urged apart from each other when such a cylindrical article is pressed against it. The legs of the second clip are substantially parallel and spaced apart by a distance less than one half the inner diameter of the first clip. The inner legs of the two clips are connected by a device which permits the first clip to rotate about the second clip to any of a number of desired rotational settings.

The present invention also provides a method of using a holder having first and second clips arranged with their mouths facing substantially the same direction. The first clip is provided with an inner surface which is shaped to hold a cylindrical article and a mouth which is normally open so as to allow the legs of this first clip to be urged apart from each other when such a cylindrical article is pressed against it. The holder is mounted at a designated location on the user's body by attaching the second clip to an item worn by the user, with the mouth of that clip facing generally downwardly. A substantially cylindrical article is inserted into the first clip by placing the article against the mouth of this clip and lifting the article upwardly into contact with its inner surface, with the axis of the cylindrical article in a generally horizontal orientation. Preferably, the insertion of the article is performed by balancing it in one of the user's hands, placing the thumb of that hand on an upwardly facing surface of the holder and lifting the article into the first clip by pulling the article and thumb toward each other. This method may also be used effectively with a single clip attached to an item of clothing and facing generally downwardly.

BRIEF DESCRIPTION OF THE DRAWINGS

FIG. 4 is a perspective view showing another embodiment of a holder according to the present invention;

FIG. 5 is a side elevational view of a third embodiment of a holder according to the present invention;

FIG. 6 is a fragmented front elevational view of the holder of FIG. 5, showing an alternate rotational setting of the main clip in phantom, and FIG. 7 is a perspective view of a fourth embodiment of a holder according to the present invention.

DESCRIPTION OF THE PREFERRED EMBODIMENTS

Figure 1:
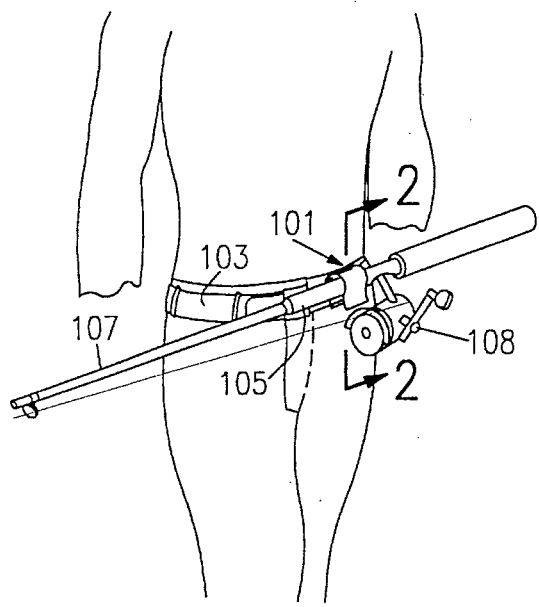
FIG. 1 is a perspective view of a holder according to the present invention attached to a user's belt and holding a fishing rod.
Figure 2:
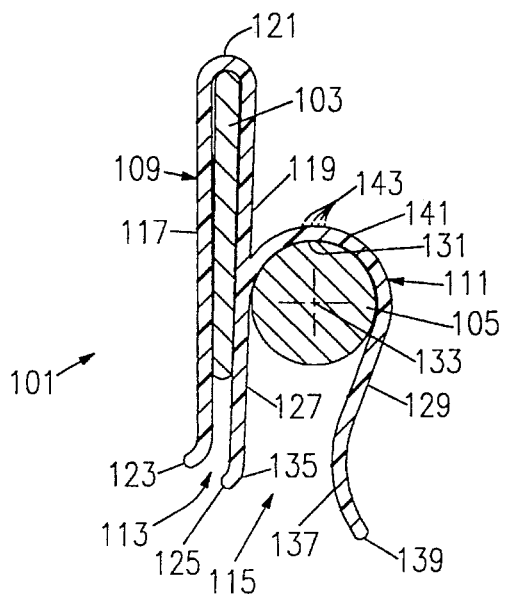
FIG. 2 is a cross-sectional view of the holder seen in FIG. 1, taken along line 2—2 of that drawing.
Figure 3:
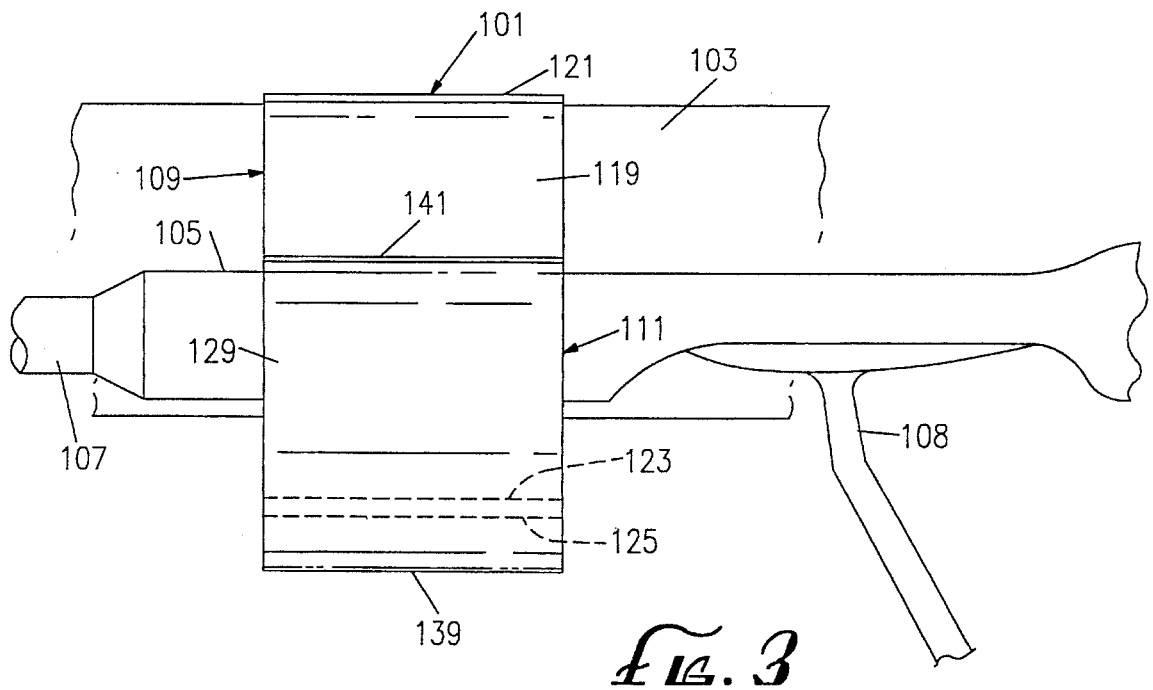
FIG. 3 is an enlarged front elevational view of the holder of FIG. 1, including fragmented views of the fishing rod and user's belt.

Referring now to the drawings, FIGS. 1–3 illustrate a holder 101 according to the invention, attached to the belt 103 of a user and holding the cylindrical handle 105 of a fishing rod 107, just forward of reel 108. The present invention is especially well suited for use as a fishing rod holder, as most fishing rods in use today have a generally cylindrical handle at their balance point, which fits securely in the holder and balances therein when the user needs both hands, as when baiting a hook.

Holder 101 comprises two generally U-shaped clips 109 and 111, as seen in FIG. 2, each having a pair of legs connected at one end with a mouth at the other end, and arranged in back-to-back fashion with their mouths 113 and 115 facing substantially the same direction. Holder 101 is preferably extruded from a resilient plastic, such as DR acrylic plastic, drawn continuously in the shape seen in FIG. 2.

Secondary clip 109 is relatively narrow, comprising two opposed, flat, substantially parallel legs 117 and 119, connected at the top by a tightly curved U-shaped portion 121. The distance between outer leg 117 and inner leg 119 preferably tapers from 3/16" at the top to 1/8" at the bottom, permitting the secondary clip 109 to snugly engage most belts, which typically vary in width from 1/8" to 1/4". This design also enables the secondary clip to grasp onto waistbands, pockets and virtually any exposed edge of clothing on the user. As used in this specification, the term "clothing" shall be construed, in its broadest sense, to include accessories and other items worn by a user.

The outer leg 117 of secondary clip 109 flares outwardly at its distal edge 123, enabling the user to more easily open the mouth 113 when attaching clip 109 to belt 103. Inner leg 119 is also flared at its distal edge 125 in the same direction, for reasons discussed below.

Main clip 111 comprises inner leg 127, which is integral with the lower half of inner leg 119, and outer leg 129, which depends from inner leg 119 and curves outwardly therefrom in a relatively broad S-shape. The inner surface 131 of outer leg 129 defines a cylindrical surface over an arc greater than 180 degrees, as seen in FIG. 2, enabling main clip 111 to retain cylindrical handle 105, or a similarly shaped article, with the mouth 115 of the clip facing downwardly. Preferably, the cylindrical portion of inner surface 131 defines an arc of approximately 210 degrees, as seen in the drawing, but this angle may be varied depending on the stiffness of the material, the weight of the article being held and the amount of tension desired for insertion and removal of the article.

To ensure rapid and smooth insertion of handle 105 in holder 101, main clip 111 is formed with a wide, open mouth 115 which is designed to allow legs 127 and 129 to be urged apart from each other when a cylindrical article is pressed against it, without requiring the user to manually spread the legs. The clip shown will accommodate cylindrical articles having a diameter of approximately 7/8" to 1". When such an article is placed against mouth 115 with its axis parallel to the axis 133 of inner surface 131, the flaring surfaces 135 and 137 just inside of the main clip's distal edges 125 and 139 contact the article at points which are sufficiently distant on the curve of its surface to urge legs 127 and 129 apart when upward pressure is applied, allowing the article to slide past these flaring surfaces and into the clip. It will be appreciated that the broad outward flare of outer leg 129 as it approaches its distal edge 139, and the opposite flare of inner leg 127 at its distal edge 125, are designed to widen the mouth 115 of the main clip and reduce surface friction as a cylindrical article is being inserted, providing smooth one-handed operation as discussed below.

In operation, holder 101 is mounted at a user's waist level by attaching secondary clip 109 to belt 103, or to any other piece of material worn by the user having a generally horizontally oriented edge such as a vest pocket, pants pocket or the upper rim of wading gaters. With the holder 101 in this normal orientation, the legs of secondary clip 109 are generally vertical, the mouth 115 of main clip 111 faces downwardly, and the axis 133 of inner surface 131 is generally horizontal. As seen in FIG. 2, the distal edge 139 of outer leg 129 extends below the other two legs of the holder in this normal orientation, and thus will be the first thing the user contacts as he lifts his hand up along the side of his body towards the open mouth of the main clip. The user balances fishing rod 107 about handle 105 on the four fingers of his open hand, and lifts his hand along the side of his body until he feels the handle contact the outer leg of the main clip. He then places the thumb of that hand on the upwardly facing surface 141 of the main clip, seats the handle in the mouth of that clip and lifts the handle into the clip by pulling the handle and thumb toward each other. Ridges 143 may be provided along the length of upwardly facing surface 141 to engage the user's thumb and provide increased friction against that surface. Alternatively, other means of engaging the thumb may be used, such as a depression or a strip of frictional material, as are well known in the art.

After insertion, the rod 107 remains seated in holder 101 while the user baits his hook or otherwise uses his now-free hands. When he is ready to hold the rod again, he simply grasps the handle and pushes down, freeing it from the main clip and back into normal use. Since the force on the holder is directed downwardly during this operation, it will be appreciated that the rod can be quickly removed without dislodging the secondary clip 109 from the belt or other piece of clothing to which it is attached.

FIG. 4 illustrates an alternate embodiment of the present invention, formed from a single strip of resilient metal, such as brass. Holder 201 comprises a narrow secondary clip 209 and a relatively broad main clip 211, arranged in back-to-back fashion with their mouths facing substantially the same direction. The main clip has an inner surface 231 shaped to hold a cylindrical article, such as a fishing rod handle, and its mouth is normally open and flared at both ends so as to allow the legs 227 and 229 to be urged apart from each other when such a cylindrical article is pressed against it. In this embodiment the inner leg 227 of the main clip is not integral with the inner leg 219 of the secondary clip, but lies flat against it, connected by bend 225. The operation of this holder 201 with a fishing rod handle or other cylindrical article is substantially the same as holder 101.

FIGS. 5 and 6 illustrate another embodiment of the present invention, using two separate clips each formed from a single strip of resilient metal, such as brass. Holder 301 comprises a narrow secondary clip 309 and a relatively broad main clip 311, arranged in back-to-back fashion with their inner legs 319 and 327 connected by a rivet 345 which permits the main clip to rotate to any of a predetermined number of positions, as seen in FIG. 6. The main clip has an inner surface 331 shaped to hold a cylindrical article, such as a fishing rod handle, and its mouth is normally open and flared at both ends so as to urge the legs 327 and 329 apart from each other when such a cylindrical article is pressed against it.

Interlocking bosses 347 may be stamped in a circular pattern so as to extend from the opposed faces of inner legs 319 and 327 toward each other, providing a predetermined number of detent positions for holding the main clip 311 at a desired rotational setting. Other means of locking the main clip at a desired rotational setting may be provided, as are well known in the art. The operation of this embodiment is substantially similar to that of the above embodiments when the mouth 315 of the main clip is oriented in any of the generally downwardly facing rotational settings. When the main clip is oriented in other rotational settings, a second hand may be needed to stabilize the article during insertion.

FIG. 7 illustrates another embodiment of the invention which uses a clip 411 similar to the main clip 311 seen in FIG. 6, with an extended inner leg 427 for ease of attachment and greater stability. Such a clip may be attached directly to a vest 449 or other item of clothing worn by the user, as by rivets 451, thread or the like, with its mouth facing generally downwardly, and used in a similar manner to the holders discussed above. Alternatively, it may be temporarily attached by inserting it into a deep, close-fitting pocket 453 on such a vest or item of clothing, so as to be removable when not in use. The clip may be also be permanently attached to such a pocket for additional support, as seen in the drawing.

From the foregoing description it will be apparent that variations may be made in the disclosed structures and methods without departing from the basic principles of the various aspects of this invention. For example, the use of a relatively broad main clip with a narrow secondary clip permits the holder to be used with a wide variety of substantially cylindrical articles, ranging in diameter from approximately ½ to 2", by scaling the size and shape of the main clip accordingly. While holders outside of this size range may be useful for some purposes, cylindrical articles outside of this range become difficult to manipulate in the method of use described above. Similarly, holders according to this invention may be made from aluminum, steel and many other materials by any manufacturing method known in the art, such as casting and other well known processes.

It will also be understood that, in addition to fishing rod handles, other substantially cylindrical articles may be conveniently placed and carried in the holder. Cylindrical cardboard milk caps measuring approximately 1½" by ¼", also known as Pogs™, have recently become popular as a variation on children's trading cards. These milk caps are normally stored in a cardboard tube measuring approximately 8" by 1½", which is awkward and bulky for children to carry in their pockets. Such tubes could be used with a holder according to the present invention to facilitate carrying and easy access.

Many other modifications to the invention disclosed above will be apparent to those skilled in the art, and it should be understood that this invention includes all modifications falling within the scope of the following claims.

We claim:

1. A method of securing a fishing rod about a designated point on a user's body, said rod having a balance point along its length about which said rod is evenly balanced when held in a generally horizontal orientation, comprising the steps of:

providing a generally U-shaped rod clip having a pair of opposed, longitudinally extending legs, each of said legs having an upper and a lower end, the upper ends of said legs being connected and the lower ends of said legs being separated so as to form a mouth into which said fishing rod may be inserted so as to rest between said legs;

mounting said rod clip at said designated point with said mouth facing generally downwardly; and inserting said fishing rod into said downwardly facing rod clip at said balance point, with the weight of said rod being fully supported by the pressure of said legs thereon.

2. A method as set forth in claim 1, wherein said fishing rod comprises a cylindrical handle at said balance point, and said inserting step comprises the step of inserting said cylindrical handle into said downwardly facing rod clip with the weight of said rod being fully supported by the pressure of said legs thereon.

3. A method as set forth in claim 2, wherein said rod clip has an inner surface between said legs which is shaped to hold said cylindrical handle, and wherein said mouth is normally open so as to allow the legs of said rod clip to be urged apart from each other when said cylindrical handle is pressed against it; and wherein said inserting step further comprises inserting said cylindrical handle into said rod clip by placing said handle against the mouth of said rod clip and lifting said handle upwardly into contact with said inner surface, with the axis of said cylindrical handle in a generally horizontal orientation.

4. A method as set forth in claim 3, wherein said inserting step further comprises the step of balancing said handle in a hand of said user, placing the thumb of said hand on an upwardly facing surface of said rod clip and lifting said handle into said rod clip by pulling said handle and thumb toward each other.

5. A method as set forth in claim 4, further comprising the step of providing said rod clip with means for engaging the user's thumb on said upwardly facing surface, and wherein said thumb placement step comprises placing said user's thumb on said engaging means.

6. A method as set forth in claim 2, wherein said rod clip has an inner surface between said legs which is shaped to conform to said cylindrical handle over an arc substantially greater than 180 degrees.

7. A method as set forth in claim 6, wherein the arc over which said inner surface of said rod clip conforms to the shape of said cylindrical handle is approximately 210 degrees.

8. A method as set forth in claim 6, further comprising the step of providing a mounting clip having a pair of opposed, longitudinally extending legs, each of said legs of said mounting clip having an upper and a lower end, the upper ends of said legs of said mounting clip being connected and the lower ends of said legs of said mounting clip being separated so as to form a mouth into which an item of clothing may be inserted so as to rest between said legs of said mounting clip;

said mounting clip being connected to said rod clip in back-to-back fashion with the mouths of both said clips facing substantially the same direction; and wherein said mounting step further comprises attaching said mounting clip to an item of clothing worn by the user.

9. A method as set forth in claim 8, wherein said legs of said mounting clip comprise two opposed, flat, substantially parallel legs connected at their upper ends by a tightly curved U-shaped portion, and spaced apart at their upper ends by a distance less than one-half the diameter of said cylindrical handle.

10. A method as set forth in claim 9, wherein the leg of each of said respective clips which is farther from the other clip defines an outer leg, and the leg which is closer to the other clip defines an inner leg;

wherein the inner and outer legs of said rod clip flare away from each other at their respective lower ends;

wherein the outer leg of said mounting clip flares away from the inner leg of said mounting clip at its lower end; and wherein the outer leg of said rod clip extends below the other legs of said rod and mounting clips when said back-to-back clips are normally oriented with the legs of said mounting clip generally vertical and the mouth of said mounting clip facing downwardly.

11. A method as set forth in claim 10, wherein the inner leg of said rod clip is integral with the inner leg of said mounting clip.

12. A method as set forth in claim 11, wherein said rod clip has an inner surface between its legs which is shaped to conform to said cylindrical handle, and wherein the mouth of said rod clip is normally open so as to allow the legs of said rod clip to be urged apart from each other when said cylindrical handle is pressed against it;

wherein said inserting step further comprises inserting said cylindrical handle into said rod clip by placing said handle against the mouth of said rod clip and lifting said handle upwardly into contact with said inner surface, with the axis of said cylindrical handle in a generally horizontal orientation;

wherein said inserting step further comprises the step of balancing said handle in a hand of said user, placing the thumb of said hand on an upwardly facing surface of said rod clip and lifting said handle into said rod clip by pulling said handle and thumb toward each other;

further comprising the step of providing said rod clip with means for engaging the user's thumb on said upwardly facing surface, wherein said thumb placement step comprises placing said user's thumb on said engaging means; and wherein the arc over which said inner surface of said rod clip conforms to the shape of said cylindrical handle is approximately 210 degrees.

* * * * *